(12) United States Patent
Shin et al.

(10) Patent No.: US 7,253,547 B2
(45) Date of Patent: Aug. 7, 2007

(54) STATOR OF MOTOR, AND METHOD FOR MANUFACTURING THE SAME

(75) Inventors: Hyoun-Jeong Shin, Incheon (KR); Dong-Il Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/985,936

(22) Filed: Nov. 12, 2004

(65) Prior Publication Data

US 2005/0218749 A1    Oct. 6, 2005

(30) Foreign Application Priority Data

Mar. 31, 2004   (KR)   .................... 10-2004-0022389

(51) Int. Cl.
*H02K 3/26*    (2006.01)
*H02K 1/18*    (2006.01)
*H02K 1/00*    (2006.01)
*H02K 3/00*    (2006.01)

(52) U.S. Cl. .................. 310/194; 310/214; 310/179

(58) Field of Classification Search ............... 310/194, 310/216, 217, 218, 71, 214
See application file for complete search history.

(56) References Cited

U.S. PATENT DOCUMENTS

| | | | | |
|---|---|---|---|---|
| 4,182,026 A * | 1/1980 | Searle | ............ | 29/596 |
| 6,081,059 A * | 6/2000 | Hsu | ............ | 310/179 |
| 6,127,753 A * | 10/2000 | Yamazaki et al. | ............ | 310/71 |
| 6,177,751 B1 * | 1/2001 | Suzuki et al. | ............ | 310/269 |
| 6,404,095 B1 | 6/2002 | Hsu | | |
| 6,555,942 B1 * | 4/2003 | Hsu | ............ | 310/208 |
| 6,595,760 B2 * | 7/2003 | Shida et al. | ............ | 417/410.1 |
| 6,858,964 B2 * | 2/2005 | Masumoto et al. | ............ | 310/216 |
| 6,876,118 B2 * | 4/2005 | Enomoto et al. | ............ | 310/180 |
| 2002/0008434 A1 | 1/2002 | Akutsu et al. | | |
| 2004/0051417 A1 | 3/2004 | Yamazaki et al. | | |
| 2005/0212377 A1 * | 9/2005 | Wang et al. | ............ | 310/259 |

FOREIGN PATENT DOCUMENTS

| | | | |
|---|---|---|---|
| EP | 1276206 | | 1/2003 |
| JP | 8-196061 | | 7/1996 |
| JP | 11-89128 | | 3/1999 |
| JP | 11089128 | A * | 3/1999 |
| JP | 11-178259 | | 7/1999 |
| JP | 2000-317861 | | 11/2000 |
| KR | 2003-0059323 | | 7/2003 |

OTHER PUBLICATIONS

English Language Abstract of JP 2000-317861.
English Language Abstract of Japanese Priority document 2002-2176753.
English Language Abstract of JP 11-178259.
English Language Abstract of JP 8-196061.
English Language Abstract of JP 11-89128.

* cited by examiner

*Primary Examiner*—Burton S. Mullins
*Assistant Examiner*—Erik Preston
(74) *Attorney, Agent, or Firm*—Greenblum & Bernstein, P.L.C.

(57) ABSTRACT

The present invention discloses a stator of a motor including a circular stator core formed by stacking a plurality of sheets, a plurality of bobbins fixed to the inner circumferential surface of the stator core at predetermined intervals and rotatably connected to each other, and stator coils wound around the outer circumferential surfaces of the bobbins to be connected to each other, and a method for manufacturing the same. The stator of the motor can reduce an assembly time by omitting a process for wiring the stator coils, and also reduce a number of components and manufacturing expenses by omitting a wiring PCB.

7 Claims, 8 Drawing Sheets

STATOR OF MOTOR, AND METHOD FOR MANUFACTURING THE SAME

BACKGROUND OF THE INVENTION

1. Field of the Invention

The present invention relates to a motor of a stator and a method for manufacturing the same, and more particularly to, a stator of a motor which can reduce manufacturing expenses and simplify a manufacturing process, by omitting a wiring process after a winding process, and a method for manufacturing the same.

2. Description of the Background Art

FIG. 1 is a perspective view illustrating a conventional stator of a motor, and FIG. 2 is a perspective view illustrating the conventional stator on which a wiring PCB has been mounted.

The conventional stator of the motor includes a stator core 110 and 112 formed by stacking a plurality of circular sheets to be insulated, a plurality of stator coils 114 mounted on the inner circumferential surface of the stator core 110 and 112 at predetermined intervals, and a wiring PCB 118 for wiring the stator coils 114.

Here, the stator core 110 and 112 consists of a yoke 110 formed by stacking the circular ring-shaped sheets to be insulated, and teeth 112 mounted on the inner circumferential surface of the yoke 110 in the radial direction at predetermined intervals.

FIG. 3 is a perspective view illustrating the conventional stator core, and FIG. 4 is a perspective view illustrating a conventional bobbin around which the stator coil has been wound.

Fastening grooves 120 to which the teeth 112 are fastened are formed on the inner circumferential surface of the yoke 110 at predetermined intervals. The teeth 112 are formed by stacking a plurality of sheets, and fixed to the yoke 110, by inserting their one-side portions into the fastening grooves 120 of the yoke 110. Bobbins 124 around which the stator coils 114 are wound are fixed to the outer circumferential surfaces of the teeth 112.

The bobbins 124 are made of insulators. The stator coils 114 are wound around the outer circumferential surfaces of the bobbins 124, and through holes 126 into which the teeth 112 are inserted are formed on the inner circumferential surfaces thereof. In addition, two connection pins to which both ends of the stator coil 114 are connected respectively are mounted on each of the bobbins 124.

The wiring PCB 118 is disposed on one-side surface of the yoke 110. The connection pins 128 mounted on each bobbin 124 are connected to the wiring PCB 118 by soldering. The stator coils 114 are electrically connected by circuit patterns 130 formed on the wiring PCB 118.

The assembly process of the conventional stator of the motor will now be explained. The stator coils 114 are wound around the plurality of bobbins 124, respectively. The teeth 112 are inserted into the through holes 126 of the bobbins 124 around which the stator coils 114 have been wound. The teeth 112 inserted into the bobbins 124 are fastened to the fastening holes 120 of the circular yoke 110 formed by stacking the plurality of sheets. The connection pins 128 of the bobbins 124 to which the stator coils 114 are connected are connected to the wiring PCB 118 by soldering. Thus, assembly of the conventional stator is finished.

However, in the conventional stator of the motor, the stator coils must be wired after mounted on the stator core. In addition, the conventional stator of the motor requires the wiring PCB for wiring the stator coils, which increases a number of components, an assembly time and manufacturing expenses.

Since the yoke of the conventional stator is a circular ring-shaped single body, a lot of scraps are formed in production. As a result, a large amount of sheets are wasted, to incur additional expenses.

SUMMARY OF THE INVENTION

Therefore, an object of the present invention is to provide a stator of a motor which can reduce an assembly time by omitting a process for wiring stator coils by rotatably connecting bobbins, so that the stator coils can be wound around the bobbins to connect the bobbins, and which can reduce a number of components and manufacturing expenses by omitting a wiring PCB, and a method for manufacturing the same.

Another object of the present invention is to provide a stator of a motor which can cut down manufacturing expenses by reducing a waste amount of sheets composing a circular yoke, by forming a plurality of segments and assembling the segments into the circular yoke, and a method for manufacturing the same To achieve these and other advantages and in accordance with the purpose of the present invention, as embodied and broadly described herein, there is provided a stator of a motor, including: a circular stator core formed by stacking a plurality of sheets; a plurality of bobbins fixed to the inner circumferential surface of the stator core at predetermined intervals, and rotatably connected to each other; and stator coils wound around the outer circumferential surfaces of the bobbins to be connected to each other.

Preferably, the stator core consists of a circular ring-shaped yoke formed by stacking a plurality of sheets, and teeth mounted on the inner circumferential surface of the yoke in the radial direction, the bobbins being mounted on the teeth, respectively.

Preferably, each of the bobbins includes: a coil winding unit around which the stator coil is wound; an inside rib formed inside the coil winding unit; an outside rib formed outside the coil winding unit; and a hinge connection unit formed at one side of the outside rib, for rotatably connecting the bobbins.

Preferably, each of the hinge connection units includes: a support unit formed at the upper portion of the outside rib; a hinge groove formed at one side end of the support unit; and a hinge protrusion formed at the other side end of the support unit, and rotatably inserted into the hinge groove.

According to another aspect of the present invention, a method for manufacturing a stator of a motor includes the steps of: forming a circular yoke by stacking a plurality of sheets; connecting and arranging bobbins in a row; winding stator coils around the bobbins arranged in a row to be connected to each other; rotating the bobbins around which the stator coils have been wound to form a circular shape, and inserting teeth; and mounting the teeth on the yoke.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
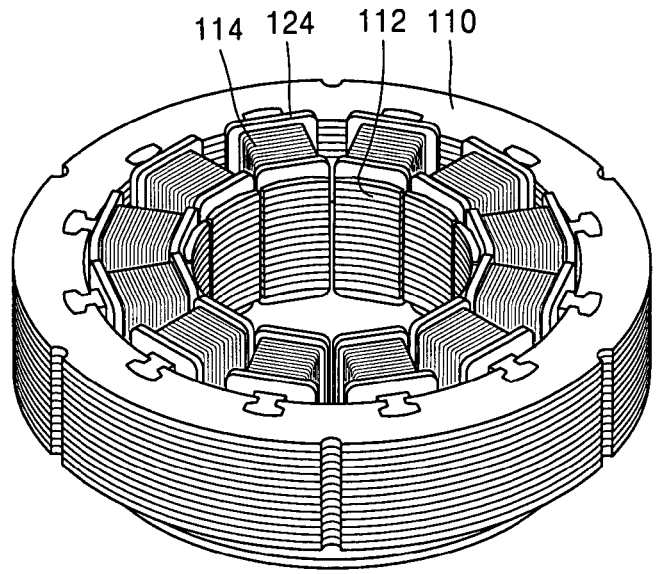
FIG. 1 is a perspective view illustrating a conventional stator of a motor.
Figure 2:
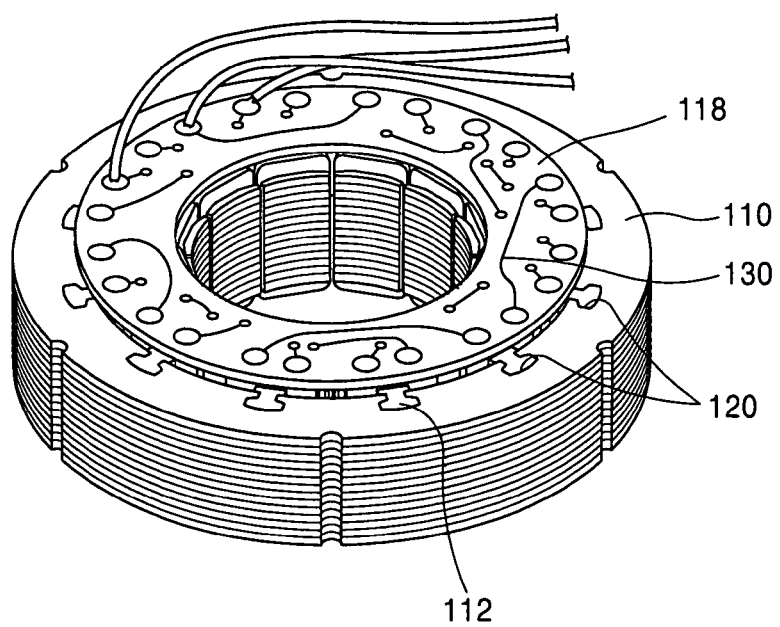
FIG. 2 is a perspective view illustrating the conventional stator of the motor on which a wiring PCB has been mounted.
Figure 3:
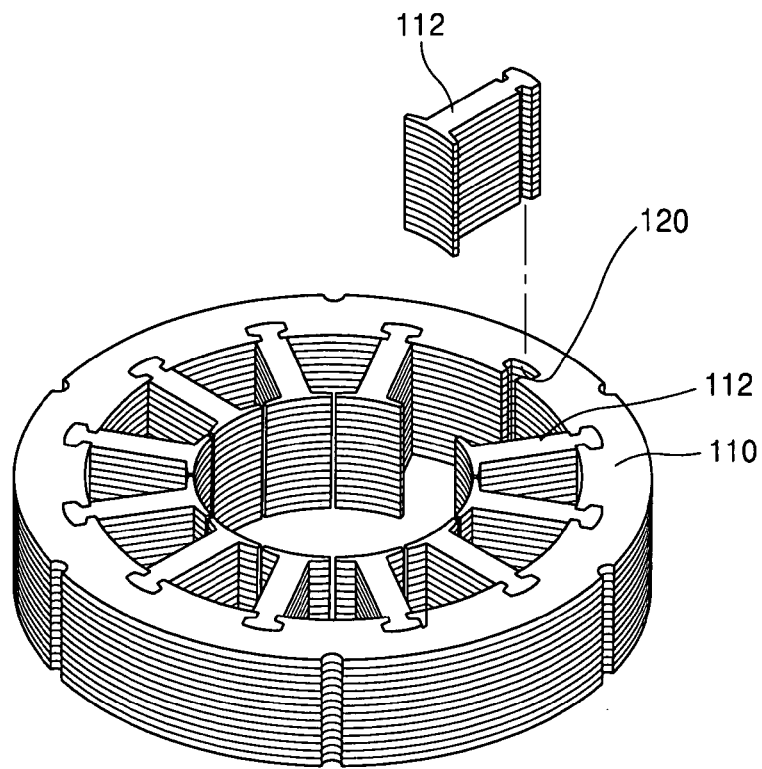
FIG. 3 is a perspective view illustrating a stator core of the conventional stator.
Figure 4:
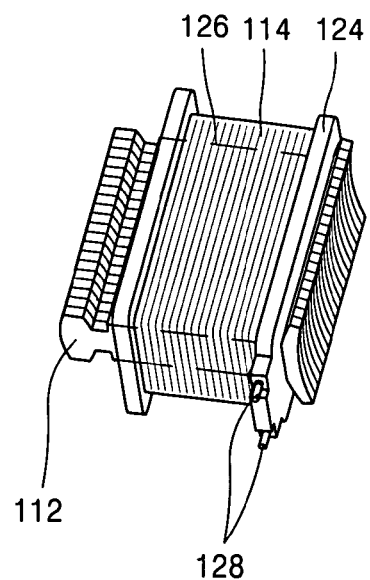
FIG. 4 is a perspective view illustrating a conventional bobbin around which the stator coil has been wound.
Figure 5:
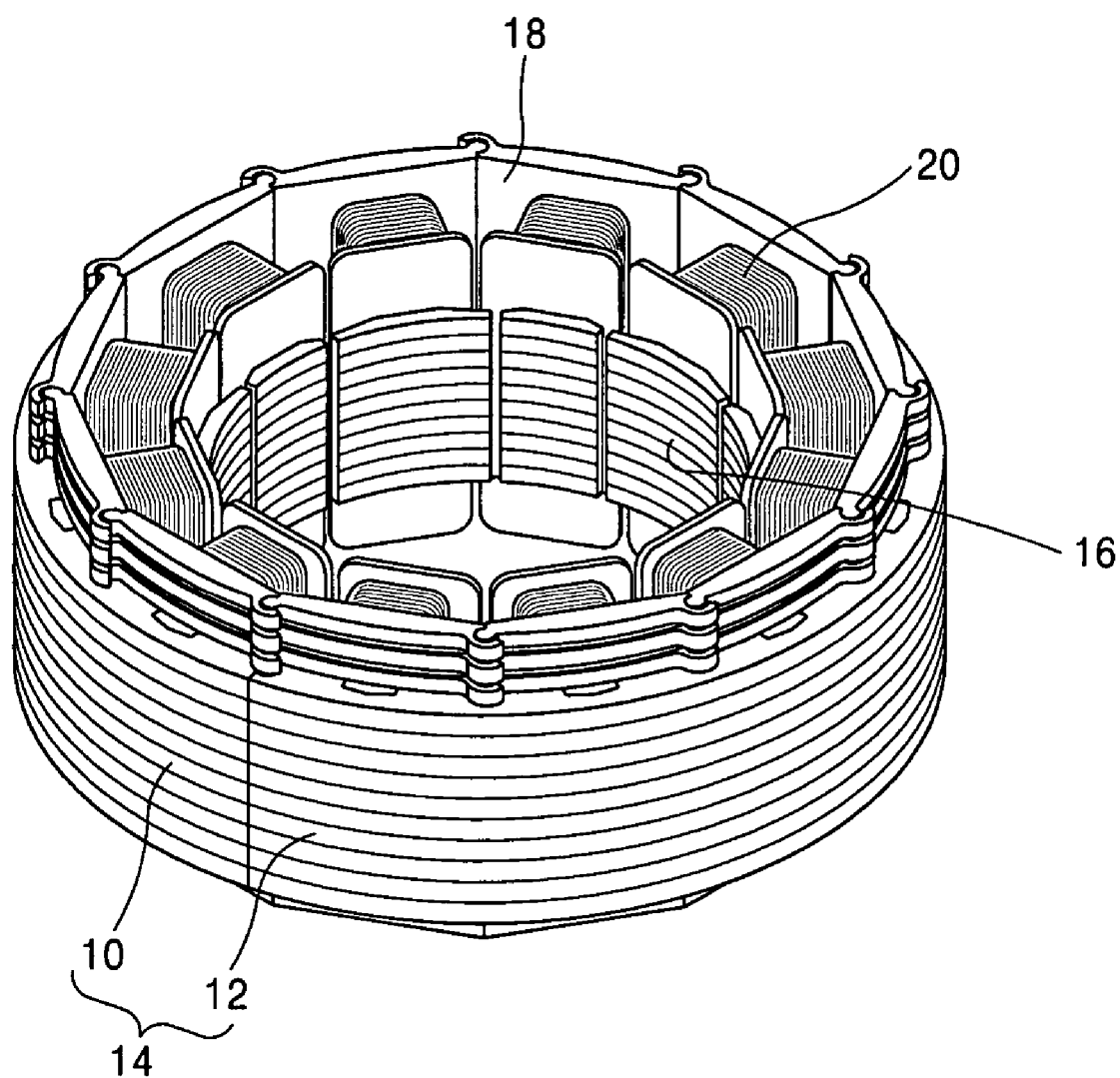
FIG. 5 is a perspective view illustrating a stator of a motor in accordance with the present invention.

FIG. 5 is a perspective view illustrating a stator of a motor in accordance with the present invention.

The stator of the motor includes a stator core 14 and 16 consisting of a yoke 14 formed by stacking a plurality of sheets 10 and 12, and a plurality of teeth 16 mounted on the inner circumferential surface of the yoke 14 in the radial direction, bobbins 18 fixed to the teeth 16 respectively and rotatably connected to each other, and stator coils 20 wound around the outer circumferential surfaces of the bobbins 18 to be connected to each other.

Figure 6:
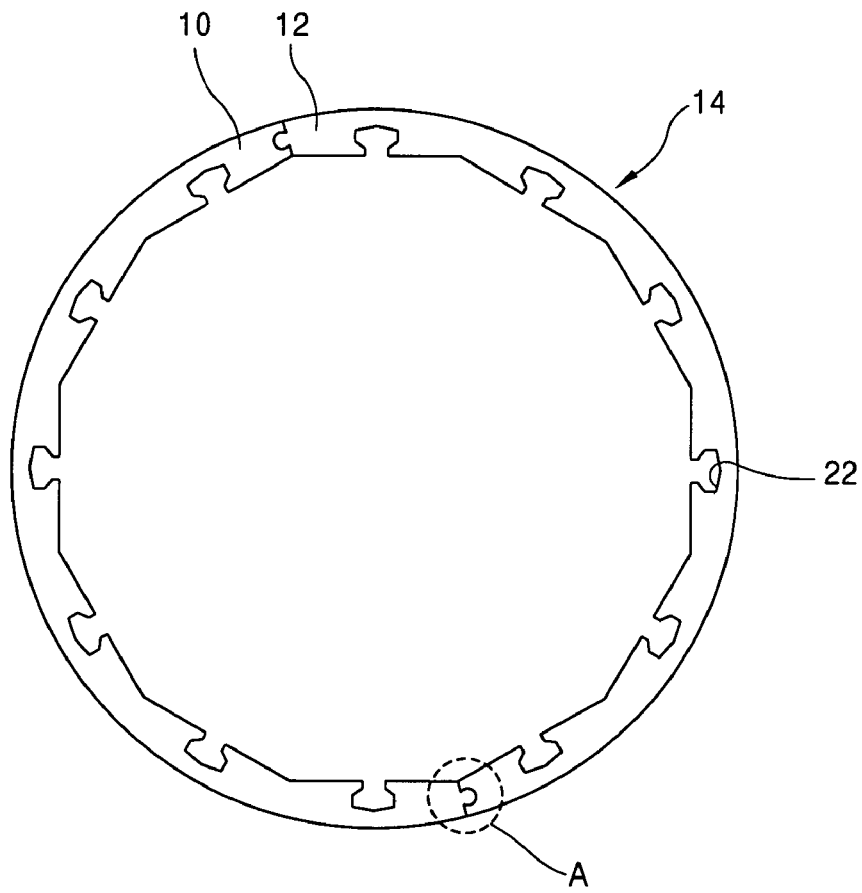
FIG. 6 is a front view illustrating a yoke of the stator in accordance with the present invention.

As illustrated in FIG. 6, fastening grooves 22 to which the teeth 16 are fastened are formed on the inner circumferential surface of the yoke 14 at predetermined intervals. The sheets 10 and 12 of the yoke 14 are comprised of a few segments assembled into a circular ring shape. That is, for example, the sheets 10 and 12 of the yoke 14 are comprised of semicircular first segments 10 and second segments 12, and both ends of the first and second segments 10 and 12 are fastened to compose circular rings.

Figure 7:
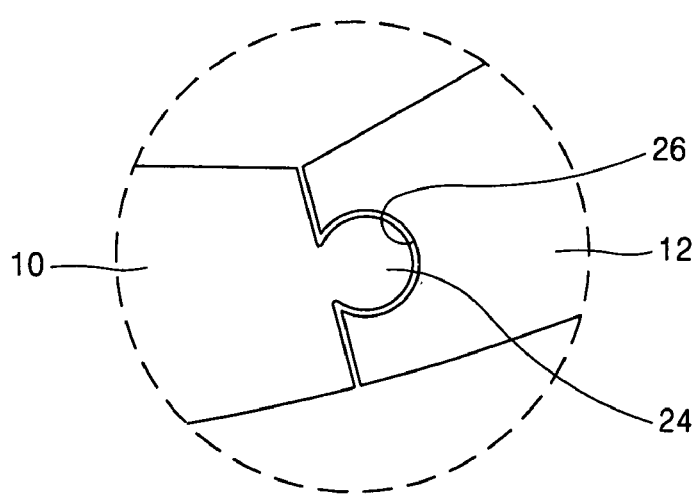
FIG. 7 is an enlarged view illustrating part A of FIG. 6.

As shown in FIG. 7, protrusions 24 and grooves 26 are formed at both ends of the first and second segments 10 and 12. The first and second segments 10 and 12 are connected to each other by inserting the protrusions 24 into the grooves 26.

Since the yoke 14 consists of the plurality of segments, more yokes 14 can be formed with the same material than when the circular yokes are formed in a single body, which reduces the unit cost of production.

Figure 8:
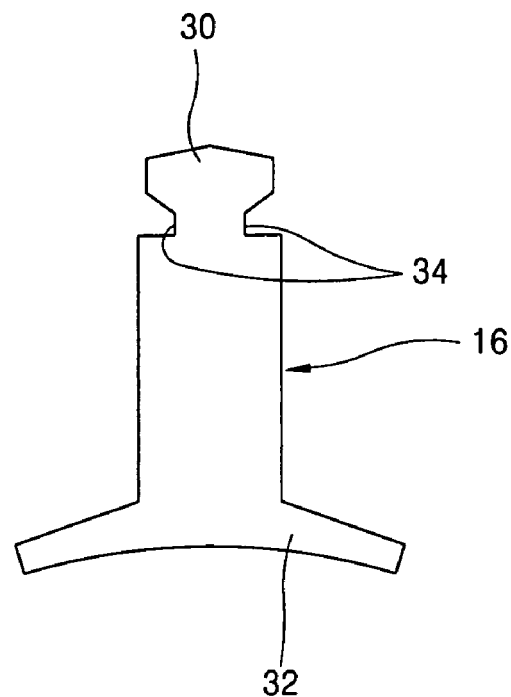
FIG. 8 is a front view illustrating a tooth of the stator in accordance with the present invention.
Figure 9:
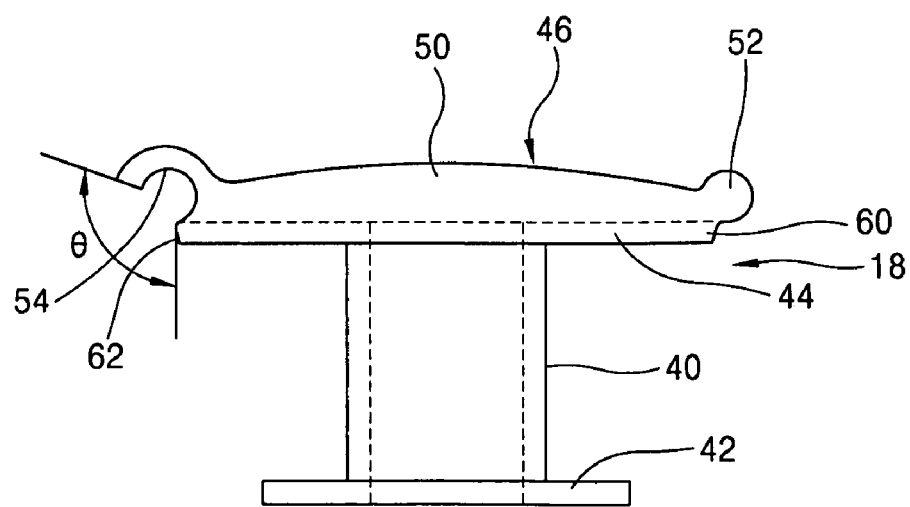
FIG. 9 is a side view illustrating a bobbin of the stator in accordance with the present invention.
Figure 10:
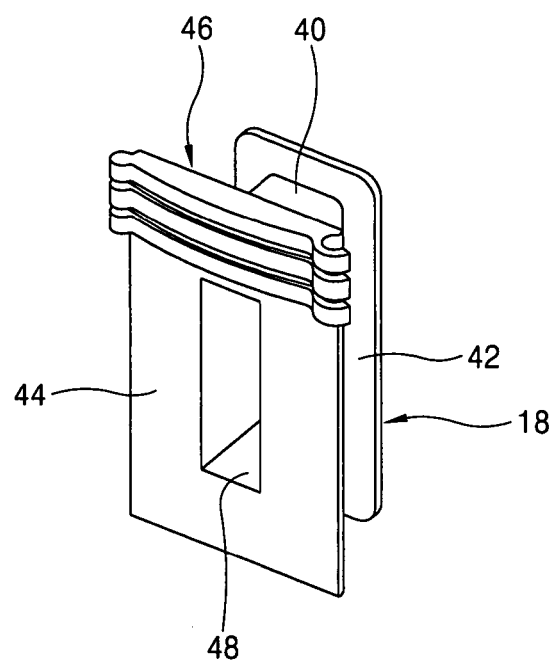
FIG. 10 is a perspective view illustrating the bobbin of the stator in accordance with the present invention.

Referring to FIG. 8, fastening protrusions 30 inserted into the fastening grooves 22 formed on the inner circumferential surface of the yoke 14 are formed at one side portions of the teeth 16, and pole shoes 32 extended in the circumferential direction of the yoke 14 are formed at the other side portions of the teeth 16. Here, neck units 34 reduced in width are formed on the teeth 16, for preventing the fastening protrusions 30 from being disconnected from the fastening grooves 22.

As illustrated in FIGS. 9 to 12, each of the bobbins 18 includes a coil winding unit 40 around which the stator coil 20 is wound, an inside rib 42 formed inside the coil winding unit 40 to contact the pole shoe 32 of the tooth 16, an outside rib 44 formed outside the coil winding unit 40 to contact the inner circumferential surface of the yoke 14, and a hinge connection unit 46 formed at the upper portion of the outside rib 44, for rotatably connecting the bobbins 18.

In addition, through holes 48 through which the teeth 16 pass are formed inside the coil winding units 40.

Each of the hinge connection units 46 includes a support unit 50 formed at the upper portion of the outside rib 44 and protruded by a predetermined width, a hinge groove 54 formed at one side end of the support unit 50, and a hinge protrusion 52 formed at the other side end of the support unit 50, and rotatably inserted into the hinge groove 54.

The support units 50 are protruded from the upper portions of the outside ribs 44 in the forward direction by a predetermined width, for reinforcing rigidity. The hinge grooves 54 are circular grooves having their one-side portions opened. The hinge protrusions 52 are rotatably inserted into the hinge grooves 54. Preferably, an open angle θ of the hinge grooves 54 is equal to or smaller than 180° in order to prevent separation of the hinge protrusions 52.

The hinge protrusions 52 are formed in a circular shape, inserted into the hinge grooves 54, and rotated within a predetermined range. Preferably, the rotation range of the hinge protrusions 52 inserted into the hinge grooves 54 is set between 160 and 200°.

Here, contact surfaces 60 and 62 having a predetermined inclination angle are formed at both ends of the support units 50, so that the bobbins 18 can contact and support each other when forming a circular shape.

The hinge connection units 46 are formed in a multiple number in order to reinforce connection rigidity of the bobbins 18. Most preferably, three hinge connection units 46 are provided.

The assembly process of the stator of the motor in accordance with the present invention will now be described.

The plurality of segments of FIGS. 6 and 7 are assembled and stacked to compose the circular yoke 14. That is, the yoke 14 is formed by inserting the protrusions 24 formed on the first segments 10 into the grooves 26 formed on the second segments 12 to compose the circular sheets, and stacking the plurality of sheets.

Figure 11:
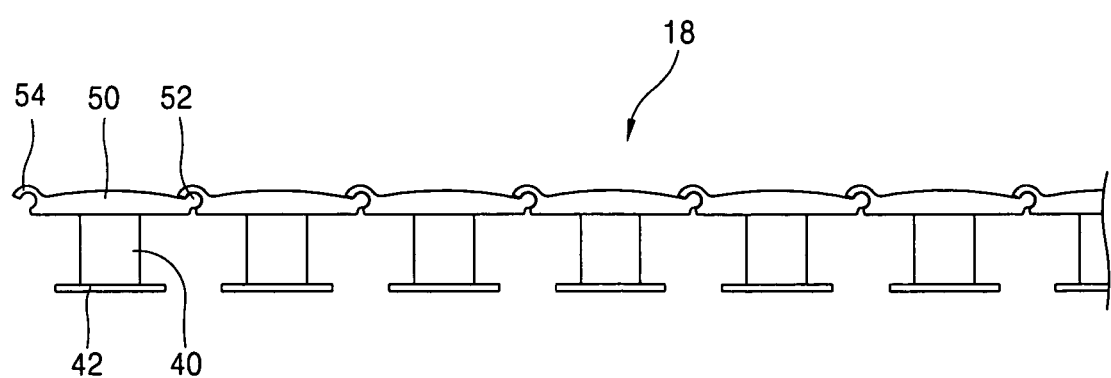
FIG. 11 is a side view illustrating the bobbins of the stator arranged in a row in accordance with the present invention.

Referring to FIG. 11, the plurality of bobbins 18 are connected to each other and arranged in a straight line shape. That is, the bobbins 18 are arranged in a straight line shape by inserting the hinge protrusions 52 into the hinge grooves 54, and the stator coils 20 are wound around the bobbins 18, respectively. Since the bobbins 18 are arranged in a straight line shape, the stator coils 20 are wound around the bobbins 18 in the arrangement order and connected to each other.

Figure 12:
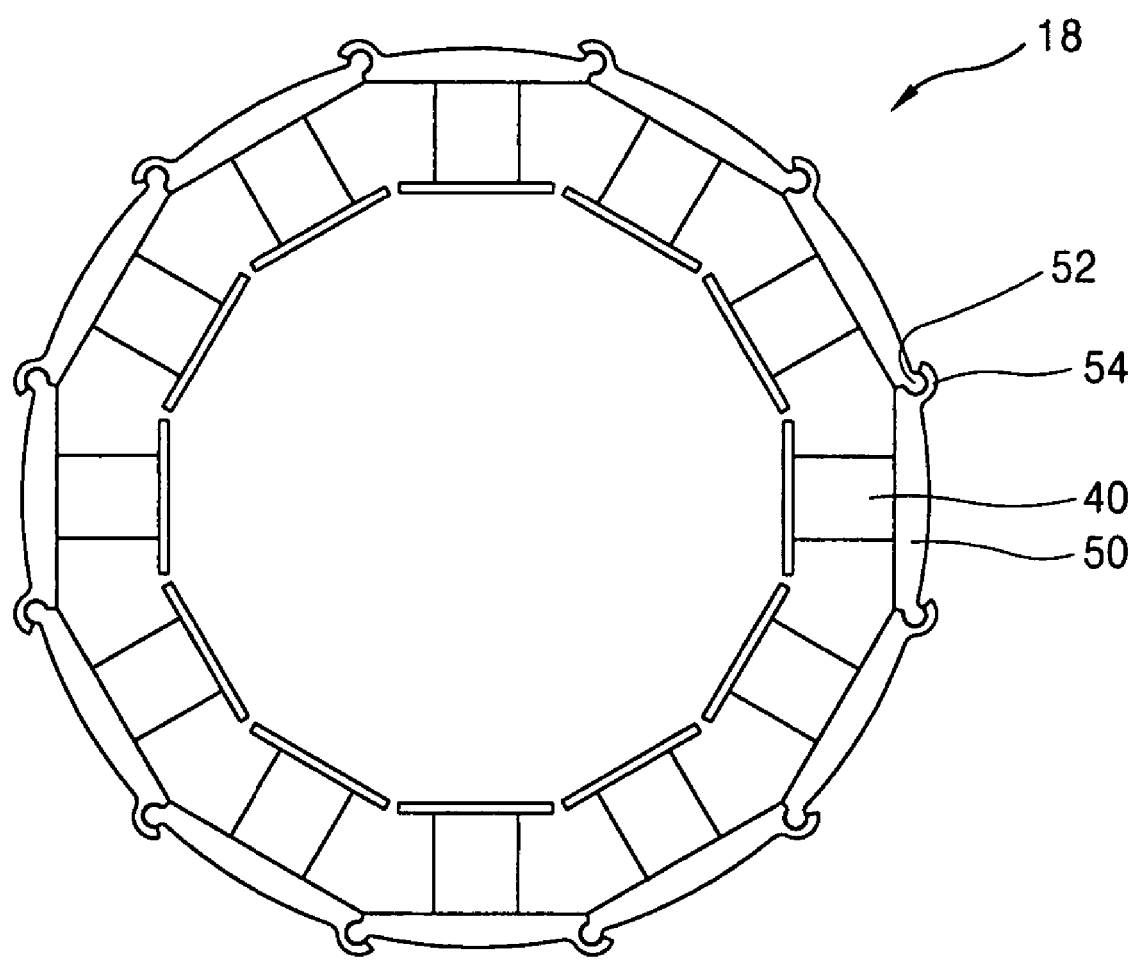
FIG. 12 is a side view illustrating the bobbins of the stator arranged in a circular shape in accordance with the present invention.
Figure 13:
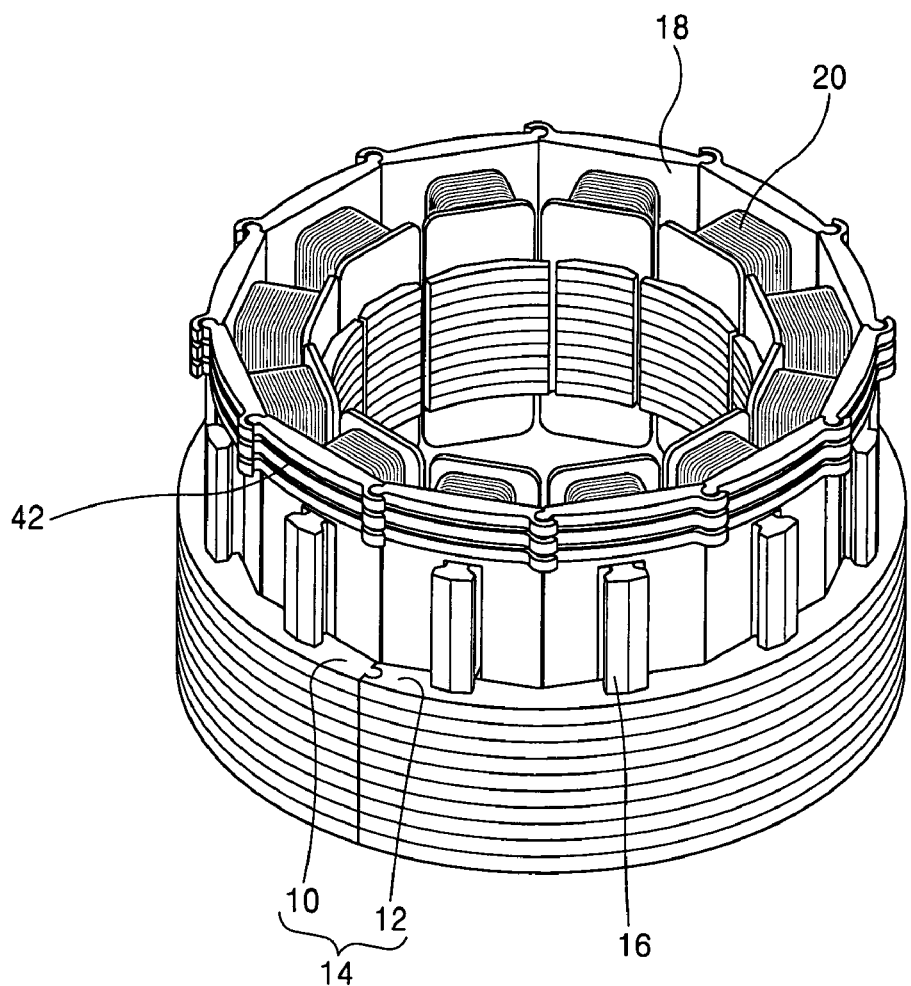
FIG. 13 is a perspective view illustrating an assembly process of the stator of the motor in accordance with the present invention.

As depicted in FIG. 12, the teeth 16 are inserted into the bobbins 18, and the bobbins 18 are rotated to compose a circular shape. As shown in FIG. 13, the fastening protrusions 30 of the teeth 16 are inserted into the fastening grooves 22 formed on the inner circumferential surface of the yoke 14. Thus, assembly of the stator is finished.

Figure 14:
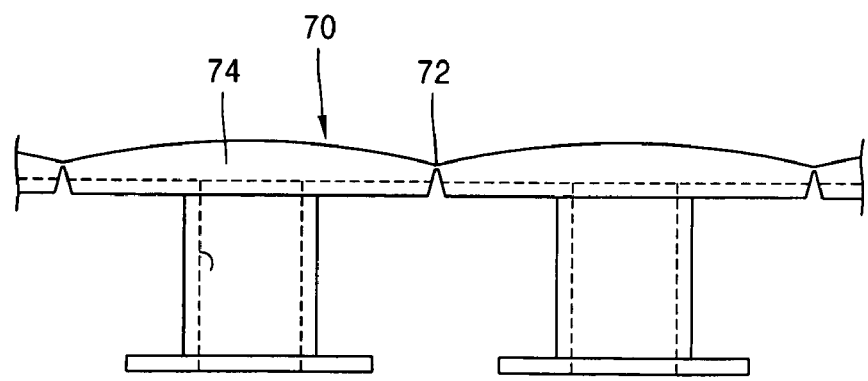
FIG. 14 is a partial side view illustrating another example of the bobbins of the stator in accordance with the present invention.

FIG. 14 is a partial side view illustrating another example of the hinge connection units of the bobbins in accordance with the present invention.

In hinge connection units of bobbins 70, connection ribs 72 are formed between the bobbins 70, for connecting the bobbins 70. That is, the connection ribs 72 are formed in a thin film shape and connected between outside ribs 74 of the bobbins 70, for wholly connecting the bobbins 70.

As discussed earlier, in accordance with the present invention, the bobbins are rotatably connected to each other and arranged in a straight line shape, and the stator coils are sequentially wound around the bobbins. Therefore, the stator coils are wound around the bobbins to be connected to each other between the bobbins. As a result, the stator coils wound around the bobbins need not be wired, which simplifies the assembly process. Moreover, special components for wiring the stator coils are not necessary, thereby reducing a number of components and cutting down manufacturing expenses.

Furthermore, the plurality of segments are assembled into the yoke, and thus scraps of the material are minimized in production, to cut down manufacturing expenses.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A stator of a motor, comprising:
   a stator core provided by stacking a plurality of sheets;
   a plurality of bobbins fixed to an inner circumferential surface of the stator core at predetermined intervals, each bobbin having a connection portion to rotatably connect the bobbins to each other, and a coil winding unit around which the stator coil is wound,
   wherein the connection portions comprise:
   hinge connectors units having support units,
   wherein the support units have radially outer rear surfaces, and hinge grooves and hinge protrusions provided on opposing ends of respective support units, and
   wherein the hinge connection units rotatably connect the bobbins to each other such that end surfaces of the hinge grooves are configured to abut respective radially outer rear surfaces of the support units, when the bobbins are connected and arranged in a generally straight line; and
   stator coils wound around the outer circumferential surfaces of the bobbins such that the stator coils are connected to each other.

2. The stator of claim 1, wherein the stator core consists of a circular ring-shaped yoke provided by stacking a plurality of sheets, and teeth mounted on the inner circumferential surface of the yoke in the radial direction, the bobbins being mounted on the teeth, respectively.

3. The stator of claim 2, wherein each sheet of the yoke is divided into a plurality of sheets, and the plurality of sheets are connected to each other in a circular ring shape.

4. The stator of claim 3, wherein each of the sheets is divided into semicircular first segments and second segments, protrusions and grooves are provided at both ends of the first and second segments, and the first and second segments are fastened to each other by inserting the protrusions into the grooves.

5. The stator of claim 1, wherein each support unit is provided at an upper portion of a respective bobbin.

6. The stator of claim 5, wherein the hinge grooves are circular grooves having one-side portions opened, and an open angle of the hinge grooves is equal to or smaller than 180° to prevent separation of the hinge protrusions.

7. The stator of claim 5, wherein the rotation range of the hinge protrusions inserted into the hinge grooves is set between 160 and 200°.

* * * * *